United States Patent Office 3,038,865
Patented June 12, 1962

3,038,865
ACTIVATED ALUMINUM CATALYST CARRIERS
AND CATALYSTS PREPARED THEREWITH
Johan P. Abrahams, Amsterdam, Netherlands
No Drawing. Filed Jan. 28, 1959, Ser. No. 789,514
Claims priority, application Netherlands Feb. 1, 1958
14 Claims. (Cl. 252—466)

This invention relates to aluminum oxide-supported catalysts and to an improved class of aluminum oxide supports therefor. Although the invention will be described and illustrated with reference to petroleum hydrocarbon reforming catalysts of the type now used commercially for hydroforming petroleum fractions boiling in the gasoline range and for aromatizing naphthas it will be understood that the novel catalyst carriers or supports hereinafter described can also be used to prepare a wide variety of other catalysts exhibiting important advantages when used in diffusion rate controlled reactions.

The catalytic reforming of hydrocarbon mixtures such as volatile petroleum fractions is ordinarily carried out by passing a mixture of the hydrocarbons with hydrogen over a solid catalyst at temperatures above 400° C. and usually at superatmospheric pressures. Various types of active catalytic materials for this reaction are known, including the oxides or sulfides of molybdenum, tungsten and vanadium and the group 8 elements, particularly the noble metals such as platinum and palladium. Usually alumina is used as a support for these catalysts. A well known type of reforming catalyst comprises 0.1% to 1.0% of platinum and 0.1% to 8% of a halogen such as chlorine or fluorine supported by active alumina. It is known that the activity and the selectivity of this type of catalyst can be varied within certain limits by varying the platinum and the halogen contents.

It is a principal object of the present invention to produce activated alumina which when used as a support for reforming catalysts of the type described above gives catalysts having excellent activities even with low contents of the active catalytic materials. It is a further object to modify activated alumina in such a way that the resulting alumina is an improved support for catalysts used in diffusion rate controlled reactions generally. An additional object is to provide methods for manufacturing such modified and improved alumina and catalysts prepared therefrom. The invention therefore includes the novel aluminum oxide catalyst carriers, the catalysts prepared therefrom, the methods of producing these carriers and catalysts and the reforming of hydrocarbons therewith as described in the following specification and pointed out in the appended claims.

The invention is based on the discovery that the activated alumina carriers for catalysts used in diffusion rate-controlled reactions can be improved by removing most or all of the pores therein which have diameters smaller than about 70 Angstroms without, however, decreasing materially the average pore volumes of the alumina carriers as a whole. In activated aluminas of the type now used as carriers for halogen-containing platinum reforming catalysts the fine pores of less than 70 Angstroms in diameter usually constitute at least about 30% of the total porosity and about 40% or more of the surface area of the carrier. It has been found that these fine pores can be eliminated while correspondingly increasing the number or size of the remaining pores, so that no material overall loss in pore volume is sustained, by a combination of calcining and leaching with acid as will hereinafter be more fully described.

Although the invention is not limited thereby, it is believed that the much slower rate of diffusion of the reactant gases into the pores of activated alumina which have diameters less than about 70 Angstroms is one important reason why their partial or complete removal results in an increase of activity in the finished catalyst. In the platinum and halogen containing catalysts used in hydroforming it is also possible that during their use some of the platinum may migrate to the larger pores while the corresponding proportion of halogen remains in the smaller ones, thus changing their balance in the catalyst and reducing its efficiency. Regardless of theoretical reasons however, the fact which has been discovered is that activated alumina having not less than its normal pore volume, which is usually within the range of about 0.3 to 0.6 cubic centimeter per gram, but from which most of the pores smaller than 70 Angstroms in diameter have been removed will form catalysts exhibiting a higher activity and frequently a low rate of activity decline in diffusion rate-controlled reactions as compared with comparable catalysts made from ordinary activated alumina. This is shown by the following test results.

Small pellets of activated alumina prepared from aluminum hydroxide gel made by the process of U.S. Patent No. 2,274,634 and calcined for one hour at 760° C. were leached with 16% hydrochloric acid at 50° C. until 10.2% of the alumina was removed, washed with water, dried, again calcined at 760° C., impregnated with 0.334% of platinum and 0.7% of combined chlorine by soaking in aqueous chlorplatinic acid solution containing hydrochloric acid and finally dehydrated at 600° C. The resulting catalyst (catalyst A) had a surface area of 171 square meters per gram and an apparent bulk density of 0.77 gram per cc. Its pore size distribution was measured and compared with those in samples of a commercial catalyst prepared by mixing chlorplatinic acid with the same aluminum hydroxide gel, drying, pelleting and calcining for 1 hour at 600° C. (catalyst B) and at 760° C. (Catalyst C) with the following results.

TABLE I

[Cumulative percent of total pore volume (cc. per gram)]

| Pore Diameter (A) | Catalyst | | |
|---|---|---|---|
| | A | B | C |
| 40 | 0 | 5 | 7 |
| 60 | 0 | 31 | 28 |
| 80 | 12 | 49 | 48 |
| 100 | 28 | 59 | 56 |
| 120 | 42 | 66 | 63 |
| 140 | 54 | 70 | 68 |
| 180 | 69 | 78 | 77 |
| 220 | 78 | 84 | 82 |

It is seen that in catalyst A the 50% point in the distribution is shifted to a pore diameter about 50% larger than for the commercial catalysts B and C. Its improved performance is shown by the following tabulation of the results obtained in the 200 p.s.i. naphtha reforming test.

TABLE II

| Catalyst | 12 Hr. Activity | 12 Hr. Octane No. | Decline Rate, Octane No./100 Hrs. | Percent C on used Catalyst | Percent Cl in Catalyst | |
|---|---|---|---|---|---|---|
| | | | | | Fresh | Used |
| A | 167 | 99.4 | 3.2 | 2.7 | 0.70 | 0.59 |
| B | 102 | 96.4 | 2.2 | 2.5 | 0.55 | 0.50 |

This test empolys 50 cc. of catalyst in an isothermal reaction zone with a catalyst outlet temperature of 493° C., an hourly weight space velocity of 2 and a once-through hydrogen rate of 5000 standard cubic feet per barrel of feed. The feed is a Mid-Continent virgin naphtha having an A.S.T.M. distillation range of 200° to 370° F., a C.F.R.-R. octane number of 43.8 and containing 50% by volume of paraffins, 40% naphthenes and the balance aromatics. The catalyst activity is calculated as the relative quantity, expressed as a percentage, of a reference catalyst accepted by the industry as a standard that is required to produce a $C_5+$ product fraction having the same octane number under the same test conditions.

The new catalyst exhibits a higher activity coupled with a low decline rate. Furthermore it has a low carbon desposition rate. It is evident, therefore, that the novel activated alumina carriers of the invention constitute an important improvement. Methods for the production of these carriers will now be described.

It has been found that activated alumina carriers having the properties described above can be obtained by the combined steps of leaching them with acid until about 3% to 20% and preferably about 5–15% of the alumina is dissolved out and calcining at temperatures within the range of about 550° C. to 850° C. Although any acid capable of dissolving out alumina and thus compensating for the loss of fine pores by increasing the overall pore volume may be used, it is preferred to employ aqueous hydrochloric acid as the leaching agent. Other representative acids are sulfuric, acetic etc.

Any type of alumina free from alkali metal compounds and otherwise having the required purity may be used as raw material. Activated alumina is usually prepared by calcining a suitable aluminum hydroxide at temperatures within the range of about 450° C. to about 850° C. Especially favorable results are obtained using activated aluminas prepared by calcining aluminum hydroxide at about 650° to 800° C. until it is substantially dehydrated and converted into gamma-$Al_2O_3$. Although the activated alumina may be simply broken into pieces of suitable size it is preferred to start with an active alumina that has been formed to the desired shape of the ultimate catalyst particles, e.g. tablets, extrudates, beads or other shapes.

The leaching is preferably carried out by contacting the carrier pieces with aqueous hydrochloric acid having a concentration within the range of about 0.5 normal to 5 normal. The quantity of acid should be sufficient to convert the desired proportion of the aluminum into aluminum trichloride, to saturate the surface of the active alumina with chloride ions and to provide for a slight excess. Although good results are not dependent on the leaching temperature it is undesirable for practical reasons to allow the temperature of the leaching acid to rise above about 80° C. and preferably the temperature is kept at about 50° C. until about 95% of the hydrochloric acid has reacted. When low concentrations of hydrochloric acid are used the mixture is preferably heated to 50° C. at which temperature the desired amount of acid will react in about one hour. After the leaching reaction is completed the alumina is thoroughly washed with water to eliminate the excess acid and the dissolved aluminum salts.

As is indicated above the desired change in the porosity of the alumina is due to the combined effect of the treatment with acid and calcination at about 550°–850° C. for suitable times. Even a prolonged calcination of the original alumina at temperatures as high as 850° C. will not produce the effect unless acid leaching is also used. The time and temperature of calcination are interdependent to a considerable extent; i.e., a relatively short calcination at a higher temperature or a longer calcination at a lower temperature may be used. Although at temperatures above 800° C. the desired elimination of pores having a diameter smaller than about 70 A. is obtained, an unfavorable change in the properties of the alumina becomes apparent if the alumina is heated too long and above about 850° C. these adverse effects dominate the favorable change in properties.

A calcination at 550° C. for from about 3 to 5 hours, depending on the type of activated alumina, will eliminate more than half of the small pores when it is preceded by a suitable acid leaching. At temperatures in the range between about 700° and 800° C. this occurs much more rapidly, and also more completely, and a calcination varying from 30 minutes at 800° to several hours at 700° C. is sufficient. Heating for a time longer than that necessary to remove most or all of the fine pores does not improve the properties of the alumina to an appreciable extent and is therefore unnecessary. In a preferred procedure the acid treated alumina is calcined at temperatures and times between about 650° C. for about 1–4 hours and 800° C. for 0.5–1 hour.

It will be understood that the optimum heating conditions are not necessarily the same for all aluminas. However they can easily be determined by considering that the heating should be such as to eliminate at least a major proportion and preferably substantially all of the pores with a diameter below about 70 A. while avoiding the adverse effects that occur when the alumina is overheated at the more highly elevated temperatures. The contribution to the total pore volume of the pores below this diameter can be calculated from the desorption branch of the adsorption-desorption isotherm of nitrogen at the boiling temperature of liquid nitrogen, based on the Kelvin formula, as described by Barrett et al. in J.A.C.S. 73 (1951), at page 373. The pore volume is derived from the nitrogen adsorption at $p./p._0 = 0.98$. This implies that the volume of the pores up to a diameter of about 500 A. is measured.

Any suitable procedure may be used for impregnating the improved carriers of the invention with catalytic materials. Catalysts for use in hydroforming and aromatizing petroleum hydrocarbons may be prepared by soaking preshaped pieces or pellets of the pretreated activated alumina in aqueous platinic chloride solutions, preferably having a concentration and volume such as to introduce about 0.1% to 1% of platinum into the finished catalyst. An aqueous solution of the chloride of palladium or other noble metal of group 8 of the periodic system may be used instead of the platinum salt, or any other active catalyst material such as those listed above as being in general use may be employed. When platinum catalysts containing increased quantities of halogen are desired such as those containing up to about 1% of combined chlorine or fluorine an aqueous chlorplatinic acid solution containing added hydrochloric or hydrofluoric acid may be used as the impregnating agent. Impregnation with the platinum or palladium chloride solution may be followed by a treatment with hydrogen sulfide, ammonium sulfide, hydrogen or other precipitant.

After the active catalytic material is applied the pellets are preferably dried at about 120° C. and are then dehydrated by heating at about 600° C. in a muffle furnace for about one hour. It will be understood that this final dehydration is a customary procedure in preparing platinized catalysts of this type and has no relationship to the preliminary calcinations that are performed in conjunction with acid leaching to remove fine pores from the activated alumina. Thermal treatments applied after the pores of the catalyst have been impregnated with platinum do not achieve the advantages of the invention, as has been shown by the comparative figures in Table II.

The invention will be further described and illustrated by the following examples to which, however, it is not limited.

*Example 1*

Three different types of active alumina A, B and C, all three in the form of cylindrical tablets with a diameter and height of 3 mm., were subjected to the following treatment:

To 375 g. 16% hydrochloric acid contained in a glass beaker, 250 g. of the active alumina was added. The temperature of the mixture rose to an extent dependent of the type of alumina used. After a contact time of 20 minutes the alumina pills were washed by decantation first with cold distilled water, subsequently with distilled water of 50° C. until the effluent showed only a faint reaction on chloride ions. The pills were dried at 120° C. and then calcined for 2½ hours at a temperature of 750° C.

The rise in temperature on contacting the oxides A, B and C with the hydrochloric acid respectively were 65° C., 25° C. and 56° C. The percentages of alumina extracted from the pills were 10.7%, 10.8% and 10.6%.

The products obtained from the oxides A, B and C are marked A1, B1 and C1. Some important physical properties are given in the following table.

| alumina | A | A1 | B | B1 | C | C1 |
|---|---|---|---|---|---|---|
| surface area m.²/g | 222 | 191 | 242 | 155 | 253 | 197 |
| pore volume cm.³/g | 0.40 | 0.45 | 0.33 | 0.36 | 0.47 | 0.49 |
| pore size distribution (percent of the pore volume existing in pores with a diameter smaller than the indicated value.): | | | | | | |
| <70 A | 30 | 10 | 65 | 20 | 27 | 14 |
| <80 A | 51 | 18 | 68 | 33 | 39 | 22 |
| <90 A | 72 | 31 | 70 | 45 | 55 | 32 |
| <100 A | 88 | 44 | 72 | 56 | 82 | 43 |
| <110 A | 95 | 62 | 74 | 65 | 87 | 53 |

As a result of the treatment the surface areas of the aluminas have decreased: the pore volumes have increased somewhat. The contribution to the total pore volume of the pores with a diameter smaller than about 70 A. has decreased considerably. Both the original aluminas and the treated aluminas were used for the preparation of reforming catalysts. For this purpose the aluminas were impregnated with a solution containing chloroplatinic acid and hydrochloric acid and subsequently dried and ignited at a temperature of 540° C. The obtained catalysts were compared in their effectiveness for reforming hydrocarbon mixtures in the following way: 45 ml. of the catalyst were heated in a reactor at 492° C. under a hydrogen pressure of 13.5 atmospheres. During a period of 20 hours a mixture of paraffinic oil cut having a boiling range from 100° C. to 160° C. and hydrogen in a molar ratio of 1:5 was passed through the reactor. The pressure was kept at 13.5 atm.; the temperature at the entrance of the catalyst bed was maintained at 492° C. The flow rate was kept constant during the run. The aniline point of the obtained reformate was determined.

The space velocity at which this aniline point was obtained was compared with the space velocity at which a standard reforming catalyst produces a reformate with the same aniline point, the other conditions of the run being identical. The rates of the space velocity with the unknown catalyst and that with a standard catalyst expressed as a percentage was defined as the volume activity of the unknown catalyst. The results of the reforming tests were:

| | Compacted bulk density, g./cm.³ | Weight, percent Pt | Weight, percent Cl | Volume activity (standard catalyst = 100) |
|---|---|---|---|---|
| A | 0.80 | 0.38 | 0.57 | 90 |
| A1 | 0.78 | 0.38 | 0.60 | 165 |
| B | 0.85 | 0.37 | 0.51 | 115 |
| B1 | 0.82 | 0.37 | 0.60 | 200 |
| C | 0.69 | 0.37 | 0.54 | 85 |
| C1 | 0.66 | 0.37 | 0.63 | 140 |

The catalysts prepared with the aluminas A1, B1 and C1 appear to be much more active than the catalysts prepared from the original aluminas A, B and C.

*Example 2*

The aluminas A, B and C were calcined during 1 hour at 780° C. The obtained aluminas were marked A2, B2 and C2. These aluminas were subsequently treated with hydrochloric acid and calcined according to the method described in Example 1. The rise in temperature on contacting the aluminas with hydrochloric acid were respectively 52° C., 23° C., and 39° C. The percentages of extracted alumina were 10.5%, 8.5% and 8.9%.

The resulting aluminas were marked A2-1, B2-1 and C2-1. The physical properties are given in the following table.

| Alumina | A2 | A2-1 | B2 | B2-1 | C2 | C2-1 |
|---|---|---|---|---|---|---|
| surface area m.²/g | 194 | 168 | 177 | 140 | 202 | 185 |
| pore volume cm.³/g | 0.38 | 0.455 | 0.32 | 0.355 | 0.44 | 0.505 |
| pore size distribution in percent: | | | | | | |
| 70 A | 23 | 7 | 49 | 15 | 19 | 10 |
| 80 A | 37 | 12 | 58 | 28 | 28 | 15 |
| 90 A | 56 | 20 | 64 | 41 | 42 | 23 |
| 100 A | 74 | 29 | 68 | 51 | 56 | 31 |
| 110 A | 83 | 40 | 70 | 61 | 70 | 38 |

In this case we also observe a decrease in surface area, an increase in pore volume and a considerable decline of the pore volume present in pores having a diameter below about 70 A. as a result of the treatment.

A comparison of the physical constants of the oxides A, B and C with the leached and calcined oxides A1, B1 and C1 and with the calcined and leached oxides A2-1, B2-1 and C2-1 shows that the combination of leaching with calcining eliminates at least one-half of the pore volume less than 70 A. and that in most cases from two-thirds to three-fourths of this small pore volume is eliminated.

The aluminas A2, B2 and C2 and the aluminas A2-1, B2-1 and C2-1 were used to prepare reforming catalysts in the manner described in Example 1. The activities of the resulting catalysts were compared with that of the standard catalyst. The results were:

| | Compacted bulk density, g./cm.³ | Weight, Percent Pt | Weight, Percent Cl | Volume activity |
|---|---|---|---|---|
| A2 | 0.81 | 0.38 | 0.55 | 100 |
| A2-1 | 0.78 | 0.39 | 0.63 | 170 |
| B2 | 0.86 | 0.38 | 0.54 | 130 |
| B2-1 | 0.82 | 0.39 | 0.57 | 220 |
| C2 | 0.70 | 0.38 | 0.51 | 95 |
| C2-1 | 0.67 | 0.37 | 0.60 | 145 |

The activities of the catalysts A2-1, B2-1 and C2-1 appear to be considerably higher than those of the catalysts A2, B2 and C2. From a comparison with the corresponding catalyst from Example 1 can be concluded that the calcination at 780° C. favorably influences the activity of the ultimate catalysts.

*Example 3*

Four samples of an active alumina D, formed in cylindrical pills of 3 x 3 mm. were calcined during one hour at temperatures of respectively 500° C., 650° C., 780° C. and 850° C. The resulting aluminas were marked D1, D2, D3 and D4. The aluminas D1, D2, D3 and D4 were subsequently treated with diluted hydrochloric acid.

In every case 250 g. alumina pills were mixed with 375 ml. of 5 N hydrochloric acid and digested for 20 minutes at a temperature of 70° C.

After washing with water until the effluent showed a weak reaction of chloride ions the samples were dried at 120° C. and subsequently calcined during 3½ hours at a temperature of 750° C.

The resulting aluminas, marked D1-1, D2-1, D3-1 and D4-1 were converted to reforming catalysts, according to the method described in Example 1. The activities of these catalysts were determined in comparison with that of the standard catalyst. The results were:

| Sample | Compacted bulk density, g./cm.³ | Weight, Percent Pt | Weight, Percent Cl | Volume activity |
|---|---|---|---|---|
| D1 | 0.58 | 0.38 | 0.52 | 115 |
| D2 | 0.59 | 0.39 | 0.54 | 125 |
| D3 | 0.59 | 0.39 | 0.53 | 130 |
| D4 | 0.60 | 0.37 | 0.55 | 120 |

*Example 4*

With the alumina A2 the following experiments were done: 100 g. samples of the alumina pills were treated with hydrochloric acid solutions of various concentrations. The quantity of these solutions was chosen so that in each experiment the same amount of hydrochloric acid was present:

| Expt. No. | Weight of pills, g. | Concentration of hydrochloric acid in N | Amount of solution, cm.³ |
|---|---|---|---|
| 1 | 100 | 1 | 500 |
| 2 | 100 | 2 | 250 |
| 3 | 100 | 3 | 166 |
| 4 | 100 | 4 | 125 |
| 5 | 100 | 5 | 100 |

The rise in the temperature when contacting the alumina with the hydrochloric acid solution respectively was 6° C., 19° C., 30° C., 41° C. and 58° C.

The reaction mixtures 1 and 2, in which the temperature stayed below 50° C., were heated in 25 minutes' time to 50° C. The reaction mixtures 3, 4 and 5 were cooled to 50° C. in the course of 25 minutes. Then all reaction mixtures were kept for 20 minutes at a temperature of 50° C.

Subsequently the reaction mixtures were brought into vertical glass tubes provided at the bottom with an effluent tube. In these columns the alumina was washed free of the excess of hydrochloric acid and aluminum trichloride with distilled water at 50° C.

Then the pills were dried at 120° C. and thereafter calcined during 1 hour at 750° C. The results were:

| Expt. No. | Code | Percent Extraction |
|---|---|---|
| 1 | A2-2 | 6.3 |
| 2 | A2-3 | 8.1 |
| 3 | A2-4 | 8.2 |
| 4 | A2-5 | 8.3 |
| 5 | A2-6 | 8.4 |

The percentage of aluminum oxide extracted within a given period of time increases with increasing hydrochloric acid concentration. With concentrations above about 2 N this increase however is relatively small. In order to make a better use of the hydrochloric acid using concentrations of 1 N or lower, longer reaction times or higher temperatures are required.

From the aluminas A2-2 etc. reforming catalysts were prepared in the manner described in Example 1. The activities of these catalysts were tested in comparison with the standard catalyst.

The results were:

| Sample | Compacted bulk density, g./cm.³ | Weight, Percent Pt | Weight, Percent Cl | Volume activity |
|---|---|---|---|---|
| A2-2 | 0.79 | 0.39 | 0.50 | 140 |
| A2-3 | 0.78 | 0.38 | 0.49 | 145 |
| A2-4 | 0.78 | 0.38 | 0.47 | 145 |
| A2-5 | 0.78 | 0.37 | 0.47 | 145 |
| A2-6 | 0.77 | 0.38 | 0.45 | 145 |

*Example 5*

With alumina A2 the following experiments were carried out: 200 g. samples of alumina pills were contacted with hydrochloric acid solutions with concentrations varying between about 1 N and 2 N.

The quantity of the solutions was varied only relatively little so that the samples were contacted with various quantities of hydrochloric acid:

| Expt. No. | Weight of pills, g. | Concentration of Hydrochloric acid in N | Amount of solution, cm.³ |
|---|---|---|---|
| 1 | 200 | 1.07 | 750 |
| 2 | 200 | 1.25 | 800 |
| 3 | 200 | 1.50 | 800 |
| 4 | 200 | 1.80 | 850 |
| 5 | 200 | 2.00 | 1,000 |

On contacting the pills with the acid in all experiments the temperature remained below 50° C. Within 25 minutes the temperature was increased to 50° C. and kept at this value for 20 minutes.

Subsequently the pills were washed, dried and calcined in the manner described in Example 3. Then the aluminas were made into reforming catalyst according to the method described in Example 1.

The results were:

| Expt. No. | Code | Percent Extraction | Compacked Bulk Density, g./cm.³ | Weight, Percent Pt | Weight, Percent Cl | Volume Activity |
|---|---|---|---|---|---|---|
| 1 | A2-7 | 3.8 | 0.80 | 0.36 | 0.52 | 135 |
| 2 | A2-8 | 7.4 | 0.78 | 0.37 | 0.53 | 145 |
| 3 | A2-9 | 8.6 | 0.76 | 0.37 | 0.51 | 145 |
| 4 | A2-10 | 10.4 | 0.75 | 0.37 | 0.52 | 145 |
| 5 | A2-11 | 16.8 | 0.71 | 0.38 | 0.51 | 145 |

From these data it is apparent that the percentage of alumina extracted from the pills increases when more hydrochloric acid relative to the quantity of pills is used.

The volume activity increases up to a percentage alumina extracted of about 7% and then remains about constant.

The bulk density of the catalyst however steadily decreases with increasing extraction. This means that for instance with sample A2-11 the same volume activity is obtained as with sample A2-8 with a somewhat lower weight of platinum in the reactor.

From a comparison with the catalyst A2 (Example 2) follows that the method according to the invention leads to a considerably improved catalyst even when extractions as low as 3.8% are used.

*Example 6*

With active alumina A2 the following experiments were done: 400 g. alumina pills were extracted with 2 liters 1.34 N hydrochloric acid, washed and dried as described in Example 4. The product was divided into equal parts and calcined for three hours at temperatures of respectively 540° C., 660° C., 730° C., 780° C. and 840° C. The obtained aluminas were platinized and the activities of the obtained catalysts were compared with that of the standard catalyst. The results were:

| Sample | Calc. Temp., °C. | Compacted Bulk density, g./cm.³ | Weight, percent Pt | Weight, percent Cl | Volume Activity |
|---|---|---|---|---|---|
| A2-12 | 540 | 0.80 | 0.38 | 0.54 | 135 |
| A2-13 | 660 | 0.80 | 0.38 | 0.59 | 145 |
| A2-14 | 730 | 0.80 | 0.38 | 0.58 | 150 |
| A2-15 | 780 | 0.81 | 0.37 | 0.54 | 155 |
| A2-16 | 840 | 0.81 | 0.38 | 0.56 | 125 |

The activity increases with increasing calcination temperature until a maximum is reached. Then the activity rapidly decreases.

*Example 7*

100 g. of an active alumina E in the form of irregular grains having a size between 1.2 mm. and 2.0 mm. were treated with 0.5 l. 1 N hydrochloric acid in the manner described in Example 4. After washing and drying the product was calcined at 750° C. for one hour. The resulting alumina was marked E1.

The aluminas E and E1 were platinized and the resulting reforming catalysts were compared in their activity with the standard catalyst.

The following results were obtained:

|    | Compacted Bulk Density | Weight, Percent Pt | Weight, Percent Cl | Volume Activity |
|----|----|----|----|----|
| E  | 0.75 | 0.39 | 0.45 | 100 |
| E1 | 0.73 | 0.38 | 0.49 | 170 |

The catalyst E1 appears to be considerably more active than the catalyst E.

*Example 8*

2400 g. of active alumina C2 in the form of 3 x 3 mm. pills were treated with 3100 ml. of 5.2 N hydrochloric acid. After washing and drying the pills were calcined for 10 hours at 780° C. The resulting product, marked C2–1 and the original alumina C2 were impregnated with a solution of palladium chloride and hydrochloric acid. The impregnated pills were dried and calcined for one hour at 540° C. The resulting palladium containing catalysts were compared in their activity with the standard catalyst. The results were:

|    | Compacted Bulk Density | Weight, Percent Pt | Weight, Percent Cl | Volume Activity |
|----|----|----|----|----|
| C2   | 0.70 | 0.58 | 0.50 | 50 |
| C2–1 | 0.66 | 0.58 | 0.45 | 80 |

Although the activities both remain considerably below the level of the standard catalyst, the advantage of the alumina C2–1 over C2 is apparent.

What I claim is:

1. A catalyst carrier consisting essentially of small pieces of activated alumina having a total pore volume not materially less than that of unchanged activated alumina but substantially free form pores smaller than 70 Angstroms in diameter.

2. A hydrocarbon reforming catalyst comprising a carrier consisting essentially of small pieces of activated alumina having a total pore volume not materially less than that of unchanged activated alumina but substantially free from pores smaller than 70 Angstroms in diameter impregnated with a minor quantity of an active hydrocarbon reforming catalytic metal.

3. A catalyst according to claim 2 in which the catalytic material is a noble metal of group 8 of the periodic system.

4. A hydrocarbon reforming catalyst comprising a carrier consisting essentially of small pieces of activated alumina having a total pore volume not materially less than that of unchnged activated alumina but substantially free from pores smaller than 70 Angstroms in diameter impregnated with about 0.1% to 1% by weight of finely divided platinum.

5. A catalyst according to claim 4 in which a halogen is combined with the alumina at the active surfaces thereof.

6. A method of producing an improved catalyst carrier which comprises removing at least a major portion of the pores having a diameter smaller than 70 Angstroms from small pieces of activated alumina while avoiding material reduction in their total pore volume by leaching said pieces with an acid until from about 3% to 20% of the alumina is removed and calcining them at about 550°–850° C. for at least a time within the range of from 30 minutes at 800–850° C. to 3 hours at 550° C.

7. A method of producing an improved catalyst carrier which comprises removing at least a major portion of the pores having a diameter smaller than 70 Angstroms from small pieces of activated alumina while avoiding material reduction in their total pore volume by leaching said pieces with hydrochloric acid until from about 3% to 20% of the alumina is removed and calcining them at about 550°–850° C. for at least a time within the range of from 30 minutes at 800–850° C. to 3 hours at 550° C.

8. A method according to claim 7 in which 0.5 normal to 5 normal aqueous hydrochloric acid is used.

9. A method of producing an improved catalyst carrier which comprises first leaching small pieces of activated alumina with an acid until from about 3% to 20% of the alumina is removed and then calcining them at about 550°–850° C. for at least a time within the range of 30 minutes at 800°–850° C. to 3 hours at 550° C.

10. A method according to claim 9 in which the leaching is carried out by reacting the pieces with aqueous hydrochloric acid and then washing them with water.

11. A method of producing an improved catalyst carrier which comprises calcining activated alumina at 500°–850° C. for at least 30 minutes, leaching small pieces of the calcined alumina with an acid until from about 3% to 20% of the alumina is removed and then again calcining them at about 550°–850° C. for at least a time within the range of 30 minutes at 800°–850° C. to 3 hours at 550° C.

12. A method of producing a hydrocarbon reforming catalyst of increased activity which comprises removing at least a major portion of the pores having a diameter smaller than 70 angstroms from small piece of activated alumina while avoiding material reduction in their total pore volume by subjecting said pieces to the steps of leaching with an acid until from about 3% to 20% of the alumina is removed and calcining at about 550°–850° C. for at least a time within the range of 30 minutes at 800°–850° C. to 3 hours at 550° C., then soaking the pieces so treated in a sufficient quantity of a solution of a platinum compound to introduce about 0.1% to about 1% of platinum therein and finally heating them to decompose the platinum compound and form finely divided platinum therein.

13. A method of producing a hydrocarbon reforming catalyst of increased activity which comprises calcining activated alumina at 500°–850° C. for at least 30 minutes, leaching small pieces of the calcined alumina with acid until from about 3% to 20% of the alumina is removed, again calcining them for at least a time within the range of 30 minutes at 800°–850° C. to 3 hours at 550° C. and then soaking the pieces so treated in a sufficient quantity of a solution of a platinum compound to introduce about 0.1% to about 1% of platinum therein and finally heating them to decompose the platinum compound and form finely divided platinum therein.

14. A method according to claim 13 in which the pieces are soaked in a chlorplatinic acid solution containing sufficient hydrochloric acid to introduce up to about 1% of combined chlorine into the catalyst.

References Cited in the file of this patent

UNITED STATES PATENTS

| | | |
|---|---|---|
| 2,723,947 | Oblad | Nov. 15, 1955 |
| 2,769,688 | Milliken | Nov. 6, 1956 |
| 2,863,825 | Engel | Dec. 9, 1958 |
| 2,866,748 | Feller | Dec. 30, 1958 |
| 2,887,455 | Cornelius | May 19, 1959 |

UNITED STATES PATENT OFFICE
CERTIFICATE OF CORRECTION

Patent No. 3,038,865                          June 12, 1962

Johan P. Abrahams

It is hereby certified that error appears in the above numbered patent requiring correction and that the said Letters Patent should read as corrected below.

Column 6, line 69, after "showed" insert -- only --; column 8, second table, heading to column 4 thereof, for "Compacked" read -- Compacted --; column 9, line 52, for "form" read -- from --; column 10, line 39, for "piece" read -- pieces --.

Signed and sealed this 20th day of November 1962.

(SEAL)
Attest:

ERNEST W. SWIDER
Attesting Officer

DAVID L. LADD
Commissioner of Patents